United States Patent [19]

Mebus

[11] 4,439,097
[45] Mar. 27, 1984

[54] SEPARATOR SHEET FEEDER

[75] Inventor: Henry R. Mebus, Nazareth, Pa.

[73] Assignee: Harris Graphics Corporation, Melbourne, Fla.

[21] Appl. No.: 327,901

[22] Filed: Dec. 7, 1981

[51] Int. Cl.³ .................. B65H 5/08; B65H 33/02
[52] U.S. Cl. .......................... 414/42; 53/157; 271/5; 271/14; 414/85
[58] Field of Search .............. 414/42, 76, 82, 85; 271/5, 14; 53/157

[56] References Cited

U.S. PATENT DOCUMENTS

| 386,440 | 7/1888 | Swift | 271/14 |
|---|---|---|---|
| 2,049,850 | 8/1936 | Lytle et al. | 271/5 X |
| 2,552,869 | 5/1951 | Sauerman | 271/5 |
| 2,815,948 | 12/1957 | Watter | 271/14 |
| 2,971,415 | 2/1961 | Gibson, Jr. | 271/5 X |
| 3,833,132 | 9/1974 | Alduk | 414/85 X |
| 3,914,154 | 10/1975 | Pfeiffer | 271/14 X |

FOREIGN PATENT DOCUMENTS 55-66452  5/1980  Japan ................... 53/157

Primary Examiner—Robert J. Spar
Assistant Examiner—Janice Krizek
Attorney, Agent, or Firm—Yount & Tarolli

[57] ABSTRACT

A separator sheet feeder for use with an automatic newspaper bundle palletizer is disclosed. An elevator mechanism maintains the top of a stack of nested separator sheets at a constant level. Suction means lifts the top sheet upward and a reciprocating carriage moves between the top of the remaining stack and the lifted sheet. The lifted sheet is deposited onto a carriage which moves the sheet to a location over a layer of newspaper bundles. As the carriage returns to get the next sheet, a stripper mechanism engages the sheet to hold it so that it drops onto the layer of newspaper bundles.

6 Claims, 10 Drawing Figures

SEPARATOR SHEET FEEDER

BACKGROUND OF THE INVENTION

The present invention relates to a feeder for feeding separator sheets between layers of newspaper bundles in a newspaper palletizer. In particular the present invention relates to an apparatus for lifting the top separator sheet from a stack of nested separator sheets and for placing the sheet on top of a layer of newspaper bundles on a pallet in an automatic palletizer.

In prior art palletizers, it has been known to feed a sheet of material between layers to stabilize the load on a pallet. In some prior art palletizers, separator sheet material has been fed from a roll and cut to length as required. See, e.g., U.S. Pat. No. 4,043,459. In other prior art devices, separator sheets have been stored in stacks and a mechanism engages the top sheet and carries it from the stack onto the layer of material on the pallet. The sheet may be picked up by a vacuum device such as that shown in U.S. Pat. No. 3,643,822. The sheet, if it is rigid enough, may be picked up by a mechanical gripper as shown in U.S. Pat. No. 4,043,097.

The flat separator sheets used in the prior art are not suitable to stabilize newspaper bundles. Newspapers have rounded corners in an end view and the strap which binds the pile into a bundle causes the stack to "butterfly" because it compresses the mid-section of the pile but not the outside portions. A separator sheet made of a thin, flexible, sheet-like material cannot adequately stabilize uneven layers of newspaper bundles on a pallet, and therefore it has been necessary to place bands around the entire pallet load to stabilize it on the pallet.

Use of separator sheets of the type disclosed in U.S. patent application Ser. No. 246,731 filed Mar. 23, 1981 by James Werkheiser and assigned to the assignee of the present invention enables a full pallet load of five or more layers of newspaper bundles to be stable enough for movement by a fork lift truck without banding around the pallet load. These separator sheets are not flat, but instead are three dimensional. These separator sheets nest together when stacked on each other, and so they cannot be slid laterally off the top of a stack, rather they must be lifted prior to lateral movement.

SUMMARY OF THE PRESENT INVENTION

The present invention provides a separator sheet feeder which can lift a separator sheet from a nested stack of such sheets and place the sheet on a layer of newspaper bundles on a pallet. It is contemplated that separator sheets of the type disclosed in the above-mentioned U.S. patent application Ser. No. 246,731 filed Mar. 23, 1981 will be fed by the separator sheet feeder of the present invention. These separator sheets are especially for use in stabilizing layers of newspaper bundles on a pallet. The contours of these separator sheets facilitate palletizing bundles of newspapers, and further because of the three dimensional nature of these separator sheets, they nest when stacked.

The separator sheet feeder includes an elevator which supports a nested stack of separator sheets. A suction device lifts the top sheet off the stack and holds it up while a reciprocating carriage moves laterally into a position between the stack and the lifted sheet. Thereafter, the lifted sheet is dropped onto the carriage, and the carriage moves laterally carrying the separator sheet to a position over a layer of newspaper bundles on a pallet. A stripper engages the rear edge of the separator sheet as the carriage withdraws to hold the separator sheet in position. The separator sheet drops onto the layer of newspaper bundles when the carraige withdraws. The separator sheet feeder not only lifts a separator sheet vertically upward from a stack of nested separator sheets but also has a very short cycle time enabling rapid operation because one sheet is lifted off the stack while the preceeding sheet is being delivered to the top of a layer of bundles.

BRIEF DESCRIPTION OF THE DRAWINGS

Further features and advantages of the invention will become apparent to one skilled in the art from the following detailed description of a preferred embodiment of the invention made with reference to the accompanying drawings in which.

DESCRIPTION OF A PREFERRED EMBODIMENT

Figure 1:
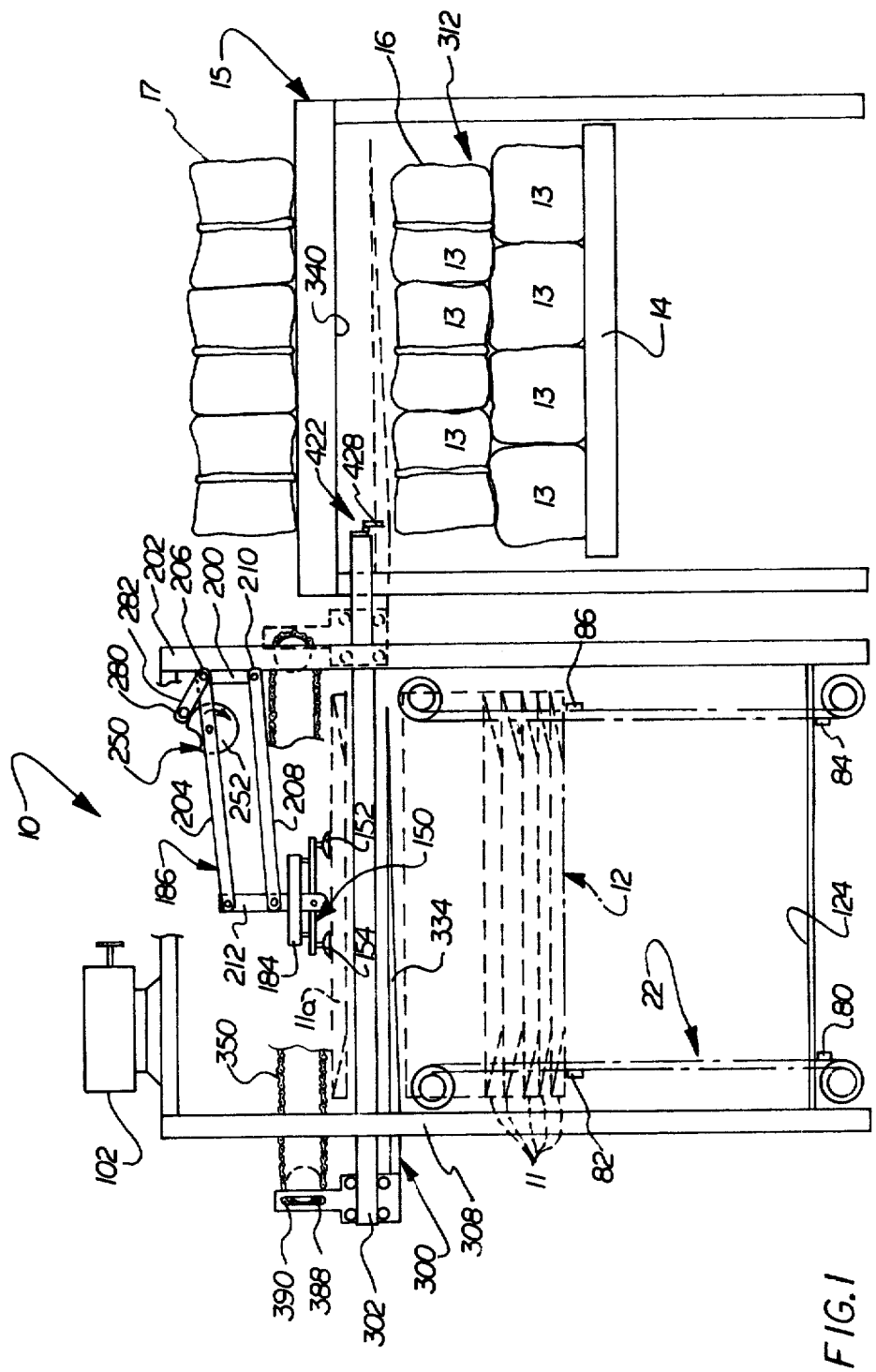
FIG. 1 is a schematic elevational view of a separator sheet feeder constructed in accordance with the present invention and positioned to feed a separator sheet between layers of newspaper bundles on a palletizer.

The present invention is a separator sheet feeder 10 (FIG. 1) which feeds separator sheets 11 from a pile 12 into position between layers of newspapers bundles 13 on a pallet 14. The separator sheet feeder 10 of the present invention is used in conjunction with a palletizer 15. The separator sheet feeder 10 feeds a separator sheet 11 on top of layer 16 of newspaper bundles 13 on a pallet 14 before the succeeding layer 17 is dropped into position by the palletizer 15.

The separator sheet feeder 10 includes an elevator mechanism 22. The elevator mechanism 22 is effective to lift a stack 12 of separator sheets 11 of the type disclosed in U.S. patent application Ser. No. 246,731, filed Mar. 23, 1981 by James Werkheiser. A stack 12 of separator sheets 11 may be up to approximately four feet tall and contain approximately one hundred fifty separator sheets.

The separator sheets 11 are especially adapted for stabilizing layers of newspapers on pallets 14 so that a full pallet load consisting of five or more layers of newspaper bundles may be moved using conventional material handling equipment without the necessity of binding the entire load to the pallet. Furthermore, the separator sheet feeder 10 is adapted for use with the automatic palletizier disclosed in U.S. patent application Ser. No. 335,839, filed Dec. 30, 1981 by James Werkheiser and assigned to the assignee of the present invention. Although the separator sheet feeder 10 is designed for use with the newspaper palletizer and separator sheet disclosed in the above-identified applications, the invention is not so limited, and it may find usefulness in other applications.

Figure 2:
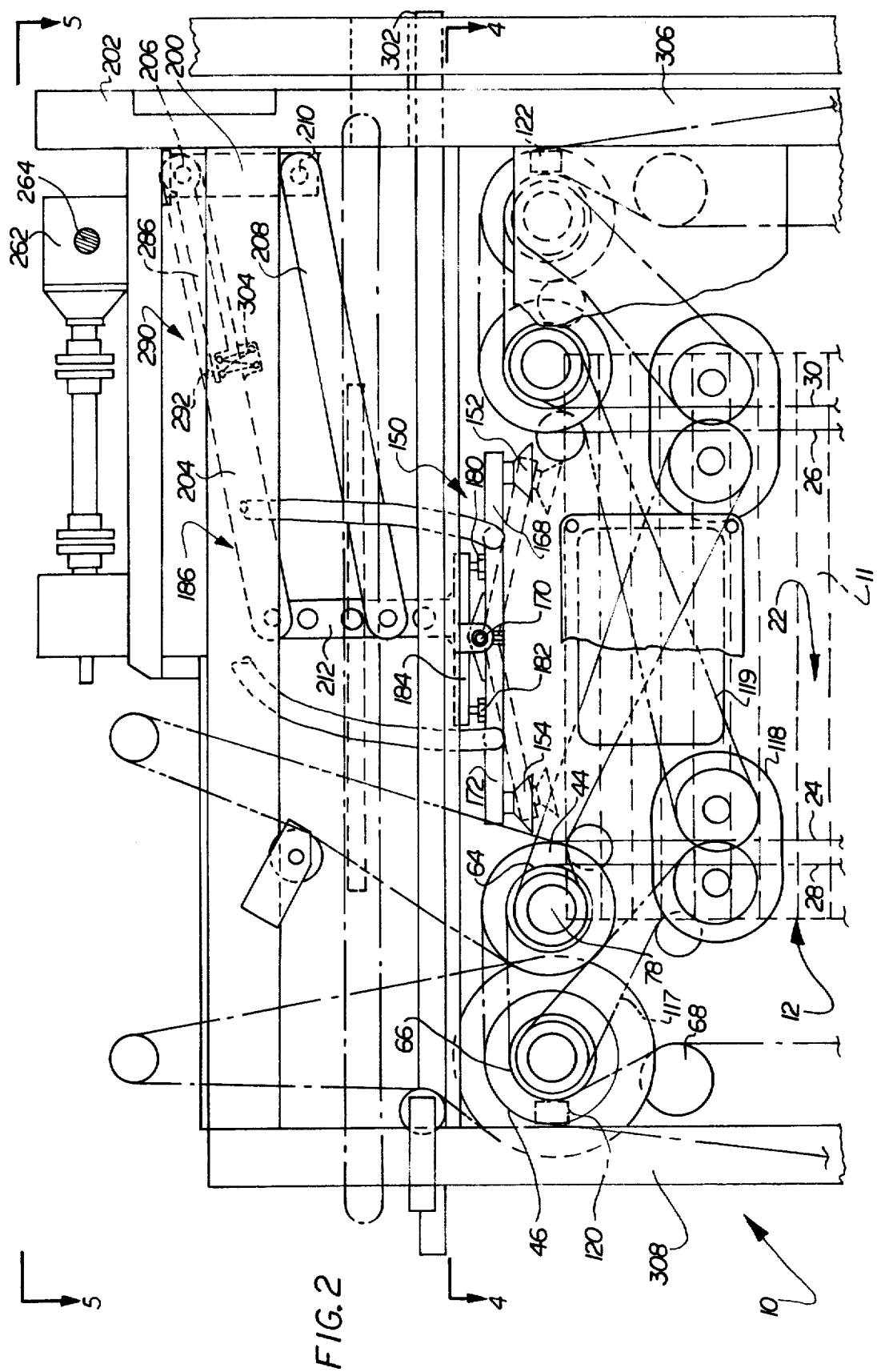
FIG. 2 is a schematic side elevational view of the upper portion of a separator sheet feeder constructed in accordance with the present invention.
Figure 3:
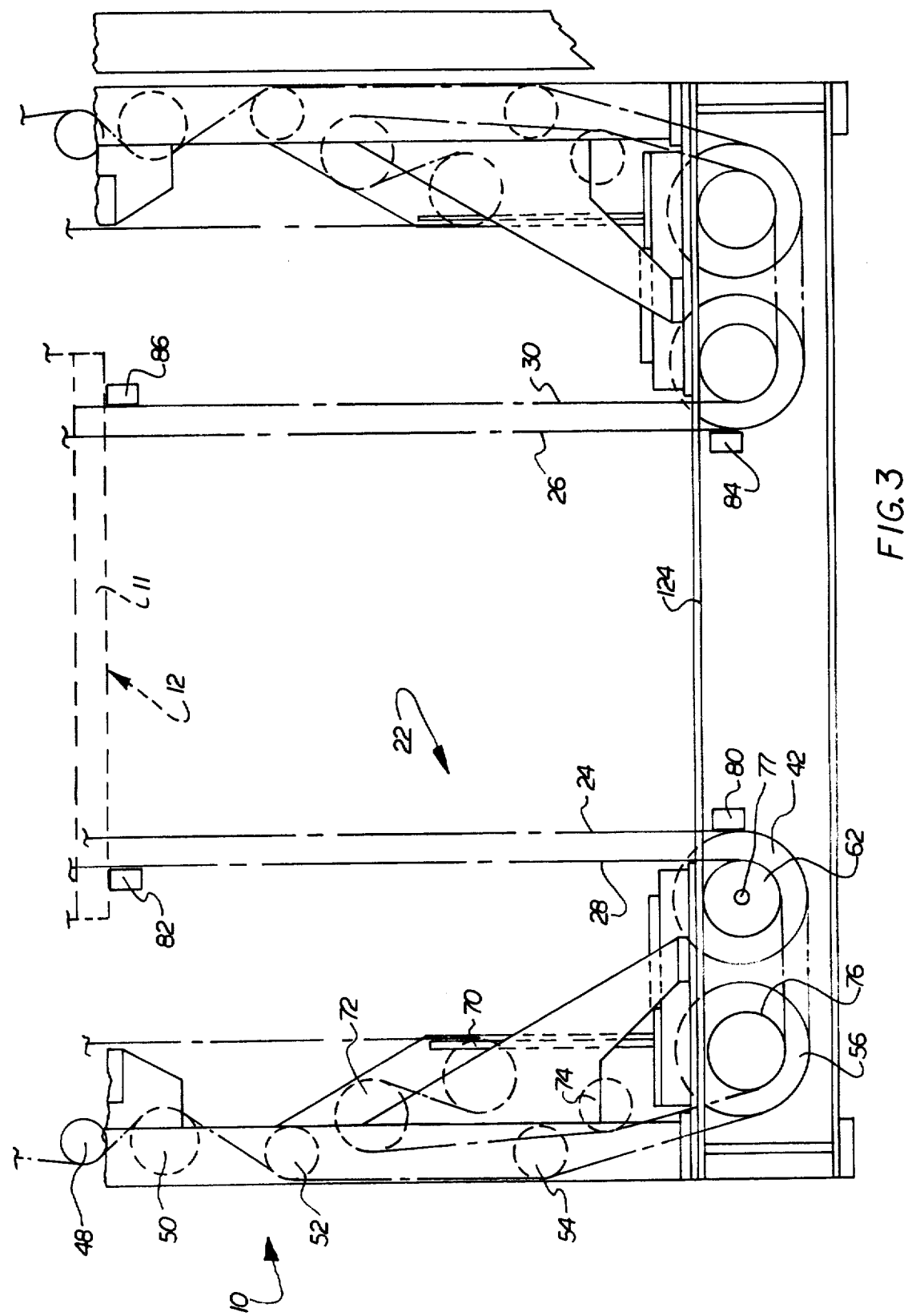
FIG. 3 is a side elevational view of the lower portion of a separator sheet feeder constructed in accordance with the present invention.
Figure 4:
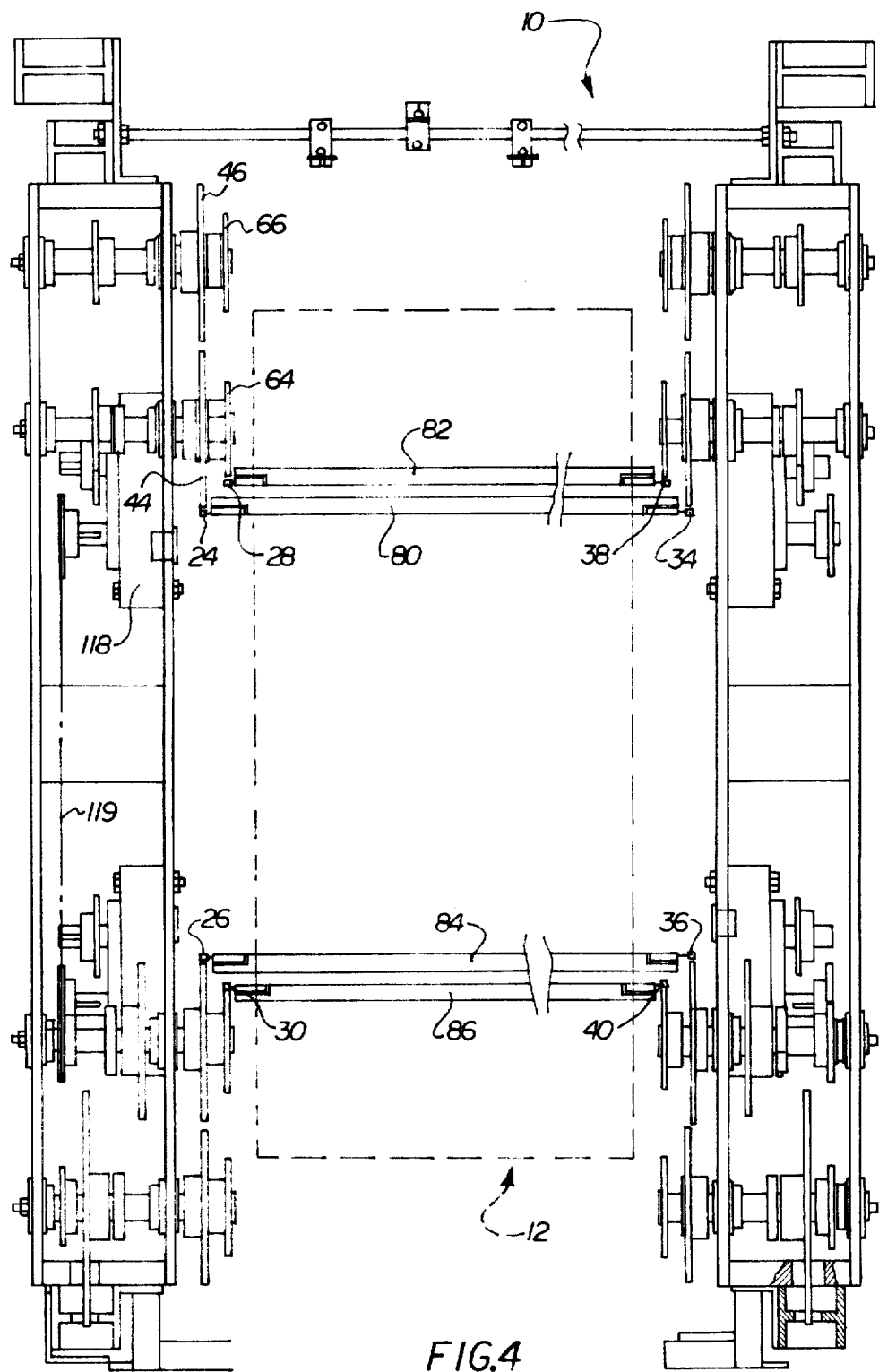
FIG. 4 is a schematic plan view of the separator sheet feeder of FIG. 2 looking generally in the direction of arrows 4—4 of FIG. 2.

The elevator mechanism 22 is illustrated in FIGS. 2 and 3 which together form a side elevational view of the sheet feeder 10. The elevator mechanism 22 includes four pairs of endless chains, an inner pair 24 and 26 and an outer pair 28 and 30 on one side of the separator sheet feeder 10 and a corresponding inner pair 34 and 36 and a corresponding outer pair 38 and 40 on the opposite side of the separator sheet feeder 10 (FIG. 4). The chain 24 is trained around sprockets 42, 44, 46, 48, 50, 52, 54 and 56 and forms a generally vertical run between sprockets 42 and 44. The outer chain 28 is trained around sprockets 62, 64, 66, 68, 70, 72, 74 and 76 and forms a generally vertical run between sprockets 62 and 64. The sprocket pairs 42, 62 and 44, 64 turn about common axes 77 and 78 with the sprockets 42 and 44 being larger in diameter than sprockets 62 and 64. The latter two sprockets 62 and 64 are located toward the inside of the machine from the sprockets 42 and 44. The result is that the vertical runs of chains 24 and 28 are offset from each other as best seen in FIG. 4.

The inner pair of chains 24 and 34 (FIG. 4) are connected by a support bar 80. Similarly, the chains 28 and 38 are connected by a support bar 82. The support bars 80 and 82 are connected to their respective chains at each end of the bar, and the bars are slightly shorter than the distance between their respective pairs of chains. It will be observed from FIGS. 2 and 3 that the paths of the chains 24 and 28 do not intersect, and accordingly the support bar 80 may be moved independently and without regard to the position of the support bar 82 by driving chains 24 and 34.

The endless chain 34 is trained around sprockets corresponding to the sprockets on which chain 24 runs, and the chain 38 is trained around sprockets corresponding to the sprockets around which chain 28 moves. The remaining chains 26, 30, 36 and 40 are similarly arranged and support bars 84 and 86 extend between the chain pairs 26, 36 and 30, 40, respectively.

The support bars 80, 82, 84 and 86 (FIG. 1) are adapted to receive a stack 12 of separator sheets 11. Therefore, the support bars 80-86 are slightly longer than the separator sheets 11 are wide, and the chain pairs 24, 34 and 28, 38 are spaced horizontally from the chain pairs 26, 36 and 30, 40 so that the support bar pairs 80, 84 and 82, 86 will both provide stable support for a stack 12 of separator sheets 11.

The chains 24, 26, 28, 30, 34, 36, 38 and 40 are driven by a motor 102 (FIGS. 1 and 5) which operates through a series of gear boxes 104 and 106 (FIG. 5) and clutches 108, 110, 112 and 114 which form a two-speed transmission between the motor 102 and drive shaft 115 for each of the two inner chain pairs 24, 34 and 26, 36, and between the motor and drive shaft 116 for the outer chain pairs 28, 38 and 30, 40. Synchronism between chains 24 and 26 (FIG. 2) is maintained through chain 117, direction reversing gear box 118 and chain 119. Similar arrangements of chains and direction reversing gear boxes connect chains 28 and 30 and also the chain pairs 34, 36 and 38, 40 (FIG. 4) on the opposite side of the separator sheet feeder 10.

A controller (not shown) maintains the top of a stack 12 of separator sheets 11 approximately at the level illustrated in FIG. 2. The controller may utilize a light source 120 and a photodetector 122 (FIG. 2) to locate the top of the stack of separator sheets 11 to control the above-described drive train in order to maintain the stack of separator sheets at the proper level.

To assure a continuous supply of separator sheets 11, while one stack is being fed (e.g., the stack resting on support bars 82 and 86 in FIG. 1) a second stack of separator sheets may be placed on a floor 124 (FIG. 3). The support bars 80 and 84 are first indexed to a position below the floor 124 by driving chains 24, 26, 34 and 36 (FIG. 4), and then the chains are driven to lift the new pile upward on bars 80 and 84 until the top of the new pile abuts the bottom of the support bars 82 and 86. When this occurs, the two stacks of separator sheets move upward in unison as the separator sheets are used.

When the upper pile (e.g., the pile which had been resting on support bars 82 and 86) is exhausted, the controller (not shown) rapidly moves chains 28, 38 and 30, 40 around the sprockets to bring the support bars 82 and 86 to a position immediately beneath the floor 124 where a new stack of separator sheets may be added. In this way a continuous supply of separator sheets is available to the separator sheet feeder 10. The control of the movement of the bars 80-86 may be accomplished with light sources and photodetectors, or other types of limit switches and proximity detecting switches may be utilized, as would be obvious to one of ordinary skill in the art.

Figure 5:
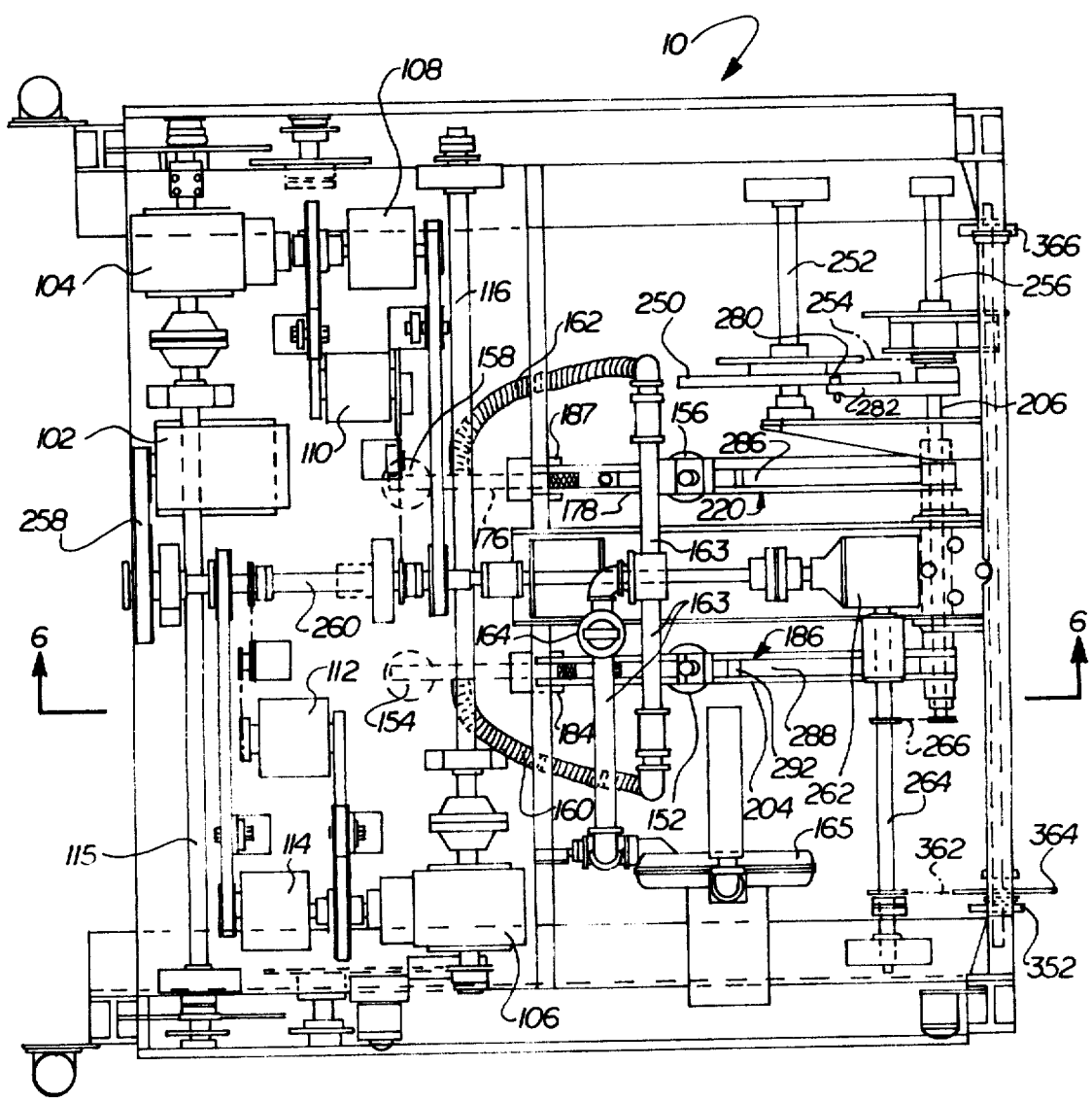
FIG. 5 is a plan view looking generally in the direction of arrows 5—5 in FIG. 2.

The separator sheet feeder 10 includes a sucker mechanism 150 (FIGS. 1 and 2) to lift the top separator sheet 11 from a stack 12 of nested separator sheets and to lift the top separator sheet vertically upward to the position of separator sheet 11a shown in phantom in FIG. 1. The sucker mechanism 150 includes four suction cups 152, 154 (FIGS. 1 and 5) and 156 and 158 (FIG. 5). The suction cups 152, 154, 156 and 158 are connected through flexible vacuum lines 160 and 162, conduits 163 and valve 164 to a vacuum pump 165.

The suction cup 152 is mounted on an arm 168 (FIG. 2) which is pivotable about the axis of pin 170 between a generally horizontal position illustrated in solid in FIG. 2 and an inclined or tipped downward position illustrated in phantom in FIG. 2. The suction cup 154 is similarly mounted on an arm 172, and suction cups 156 and 158 (FIG. 5) are similarly mounted on arms 178 and 176. The arms 168 and 172 include stop adjustments 180 and 182 (FIG. 2) which limit the upward rotation of the arms by abutting a bracket 184 to which the pin 170 is connected. The arms 176 and 178 also include stop adjustments (not shown) which cooperate with a bracket 187 (FIG. 5) similar to the bracket 184.

The bracket 184 is connected with a four-bar linkage 186 (FIGS. 1 and 2). A bracket 200 of the linkage 186 is fixedly connected to vertical frame member 202 and forms one link of the four-bar linkage. An upper bar 204 is freely rotatable about shaft 206 which is connected with the bracket 200. A lower bar 208 is freely rotatable about the axis of shaft 210 and forms the third bar of the four-bar linkage 186. Bars 204 and 208 are connected at their ends remote from the shafts 206 and 210 with a bar 212 which forms the fourth bar of the four-bar linkage 186 and which is fixedly connected with the bracket 186. When the bars 204 and 208 rotate about shafts 206 and 210 the suction cups 152 and 154 (FIG. 5) move in a generally vertical path. The bracket 187 which supports suction cups 156 and 158 is connected with a four-bar linkage 220 generally similar to linkage 186, and the linkage 220 also moves the suction cups 156 and 158 along a generally vertical path.

Figure 6:
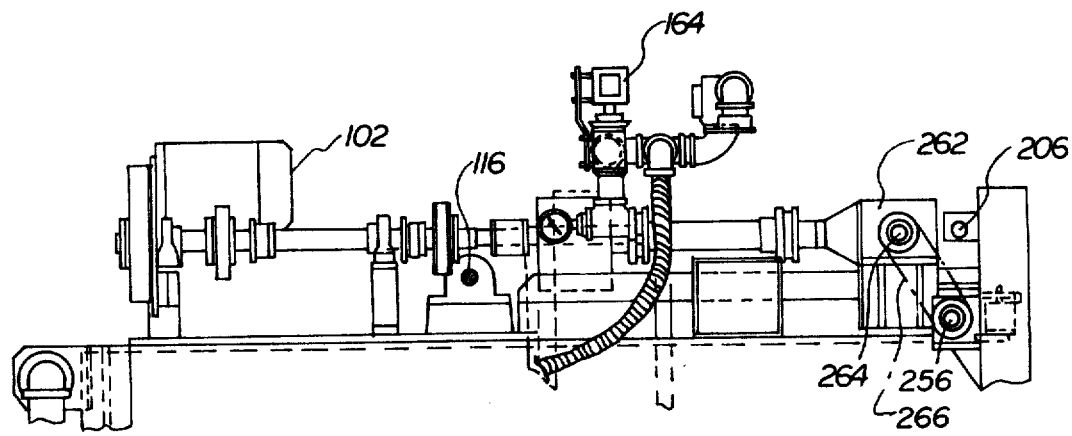
FIG. 6 is an elevation view looking generally in the direction of arrows 6—6 of FIG. 5.

The motion of the linkages 186 and 220 is controlled by a cam 250 (FIGS. 1 and 5). The cam 250 is mounted on shaft 252 and driven by a chain 254 (FIG. 5). The chain 254 is driven by a sprocket on shaft 256 which is located directly below shaft 206 (FIG. 6). Shaft 256 (FIG. 5) is driven by motor 102 through belt 258, shaft 260, gear box 262, shaft 264 and chain 266 with conventional sprockets and pulleys. A cam follower 280 rides against the outside contour of the cam 250. The cam follower 280 is connected with the follower arm 282 which is in turn fixedly connected with shaft 206. Rotation of the cam 250 causes the shaft 206 to oscillate.

Figure 7:
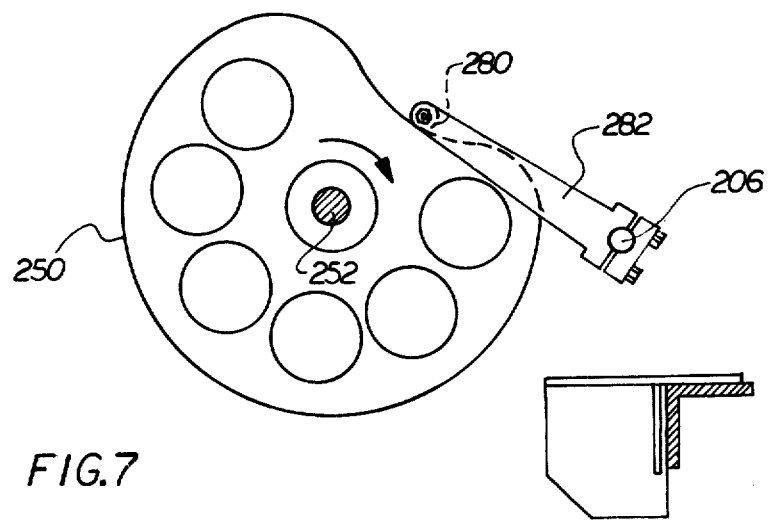
FIG. 7 is a partly schematic illustration of a cam and follower mechanism for operating a portion of the separator sheet feeder illustrated in FIG. 1.

The shaft 206 also carries a pair of actuator arms 286 and 288. Actuator arm 286 is connected with the upper link 204 of linkage 186 through a spring-biased, lost motion connection 290 (FIG. 2). When the shaft 206 rotates clockwise as viewed in FIGS. 1 and 7, the actuator arm 286 moves clockwise abutting a pin 292 fixedly connected with the arm 204 to lift the arm 204 and, therefore, to elevate the suction cups 152 and 154. The actuator arm 288 is connected with the four-bar linkage 220 in a similar fashion.

When the shaft 206 rotates counterclockwise the actuator arms 286 and 288 move the linkages 186 and 220 downward. If downward movement of the linkages 186 and 188 is obstructed or resisted by contact of the suction cups 152–158 with the top of a stack 12 of separator sheets 11, the spring 304 is compressed. The lost motion connection 290 (FIG. 2) together with the pivotable arms 168, 172, 176 and 178 permit some variation in the location of the top of the pile of separator sheets.

Contact of the suction cups 152–158 with the stack 12 of separator sheets 11 also causes the arms 168, 172, 176 and 178 to move from the inclined position shown in phantom in FIG. 2 to being nearly in horizontal alignment with one another as shown in solid in FIG. 2. At this same time, vacuum is applied by the vacuum pump 165 to the suction cups 152–185 by opening valve 164, and the topmost separator sheet 11 is thereby engaged. As the cam 250 continues rotation, the shaft 206 rotates clockwise lifting the linkages 186 and 220 and the uppermost separator sheet. In this way the topmost separator sheet 11 is lifted from the nested stack 12 of separator sheets in a nearly directly vertical path.

Figure 8:
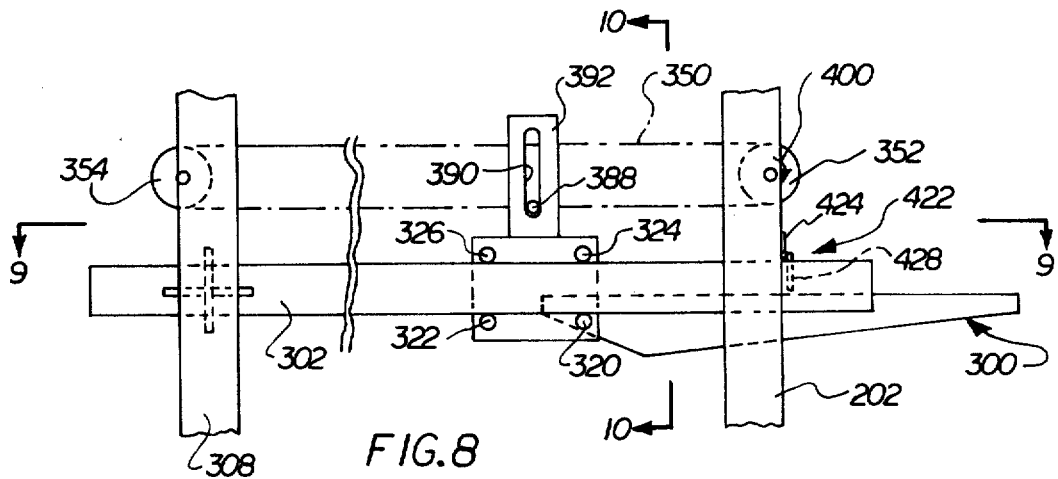
FIG. 8 is a schematic view of a reciprocating carriage forming a portion of the separator sheet feeder of FIG. 1.
Figure 9:
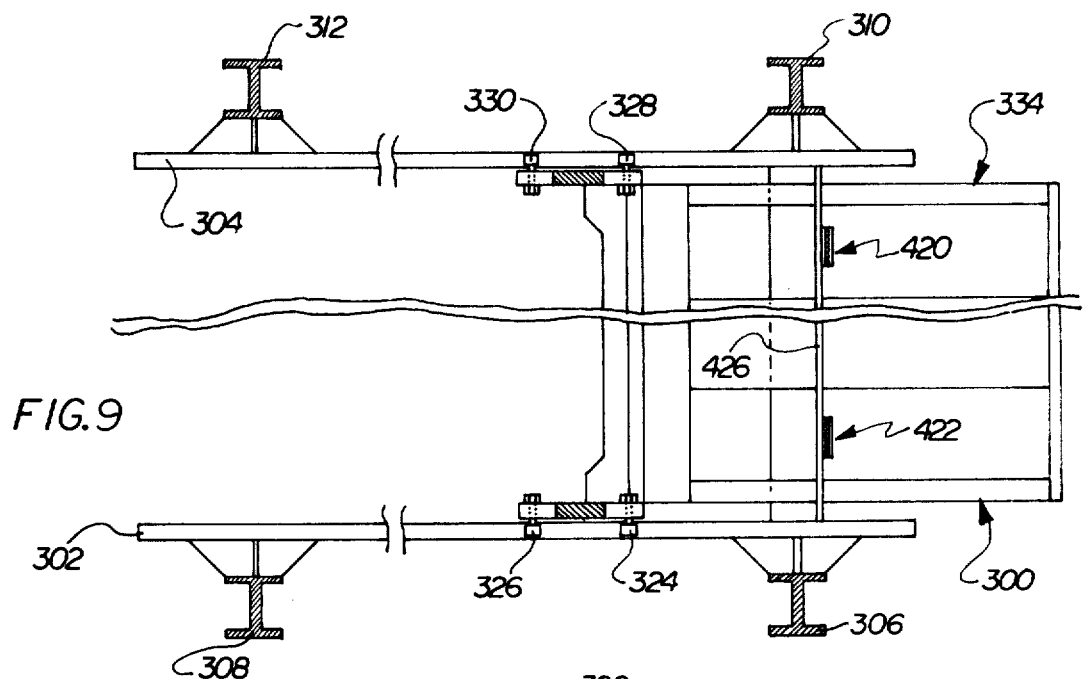
FIG. 9 is a plan view looking generally in the direction of the arrows 9—9 of FIG. 8.

The separator sheet feeder 10 includes a reciprocating carriage 300 (FIGS. 1 and 8) mounted for lateral movement on rails 302 (FIGS. 1, 2 and 9) and 304 (FIG. 9). The carriage 300 is not shown in FIG. 2 for the sake of clarity. The rail 302 is mounted to vertical frame members 202 and 308 and the rail 304 is mounted to vertical frame members 310 and 312. The rails 302 and 304 lie in a common horizontal plane parallel to the floor 124 (FIG. 3) of the separator sheet feeder 10. The rails 302 and 304 (FIG. 9) support the carriage 300 for movement from a location in which the platform 334 is located above the stack 12 of separator sheets 11 and below the elevated position of the suction cups 152–158 (shown in solid in FIG. 1) to a position (shown in phantom in FIG. 1) extending outside frame members 306 and 310 over layer 16 of newspaper bundles 13 on a pallet 14 in a newspaper palletizer 15.

The carriage 300 includes four wheels 320, 322, 324, 326 (FIG. 8) which ride on rail 302. The wheels 320 and 322 engage the lower side surface of the rail 302, and the wheels 324 and 326 ride on the upper side surface of the rail 302. Wheels 328 and 330 (FIG. 9) ride on the top of rail 304, and a pair of wheels (not shown) corresponding to wheels 320 and 322 ride on the bottom of rail 304.

The carriage 300 (FIG. 1) includes a flat platfrom 334 which is the same size as a separator sheet 11 and which provides support for a separator sheet as it is moved into position above the layer 16 of newspaper bundles 13 in a palletizer 15. The platform 334 (FIG. 9) prevents the sheet from sagging or bending and thereby enables the sheet to be inserted into a relatively narrow gap between the top of the layer 16 of newspaper bundles 13 and the portion 340 of the palletizer immediately above.

Movement of the carriage 300 is effected by an endless chain 350 (FIGS. 1 and 8) trained around sprockets 352 and 354 which are mounted to vertical frame members 202 and 308, respectively and by a corresponding chain (not shown) connected to sprockets which are supported by vertical frame members 310 and 312. The chain 350 is driven by the motor 102 (FIG. 5) through a takeoff from gear box 262 and a shaft 264 which drives a chain 362 which in turn drives a sprocket 364 connected with sprocket 352. The shaft on which sprockets 364 and 352 are mounted extends across the width of the separator sheet feeder 10 to drive at its opposite end a sprocket 366 which drives the chain opposite from the chain 350.

Figure 10:
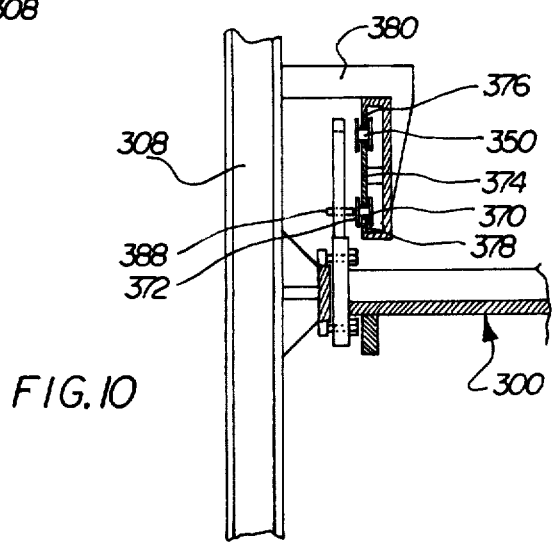
FIG. 10 is an elevation view looking generally in the direction of arrows 10—10 of FIG. 8.

The chain 350 has extended side plates 370 and 372 (FIG. 10) on each link. The side plates 370 and 372 straddle an inner guide bar 374 and outer guide bars 376 and 378 which are connected with the vertical frame members 202 and 308 by brackets similar to bracket 380. The guide members 374–378 cooperate with the sprocket 352 and 354 to form an oval path around which the chain 350 circulates.

The chain 350 carries a single pin 388 (FIGS. 8, 10 and 11) which extends laterally perpendicular to the plane of the oval path of the chain. The pin 388 extends into a slot 390 formed in a bracket 392 connected with the carriage 300. When the sprocket 352 is driven at a constant speed, the carriage 300 reciprocates between the two positions described above as the pin 388 moves up and down in the slot 390. In one extreme position the platform 334 is positioned over layer 16 of newspaper bundles 13 (shown in phantom in FIG. 1), and in its other extreme position (shown in solid) the platform is located above the stack 12 of nested separator sheets 11.

Movement of the cam 250 (FIG. 5) and the carriage 300 is synchronized so that the suction cups 152–158 (FIG. 5) move downward, engage the uppermost separator sheet, and lift it upward from the stack of separator sheets 11 while the carriage 300 is in its extended position to the right as viewed in FIG. 1 and is positioned over a partially loaded pallet 14. Thereafter, the carriage 300 moves leftward to assume its position beneath the raised separator sheet (shown in solid in FIG. 1) and the cam 250 (FIG. 5) lowers the suction cups 152–158 so that the separator sheet is placed on the carriage 300. Thereafter, the controller (not shown) closes valve 164 to cut off the vacuum to the suction cups 152–158 to release the separator sheet on the platform 334 of the carriage 300, and the suction cups 152–158 are raised again. Thereafter, the carrige 300 moves to the right to move the separator sheet into a position over a layer of bundles on a pallet while the suction cups 152-158 are lowered to pick up another separator sheet.

A stripper mechanism includes a pair of hinges 420 and 422 (FIGS. 8 and 9) which permit the separator sheet to be carried to the right in FIGS. 1 and 8 by the carriage 300, but which prevent the separator sheet from returning to the left as the carriage 300 withdraws. The hinge 422 has one leaf 424 (FIG. 8) which is fixedly connected with a frame member 426 extending between the two vertical frame members 202 and 310. The other leaf 428 of the hinge 424 hangs downward. The leaf 428 is free to rotate in a counterclockwise direction as viewed in FIG. 8, but is restrained from moving in a clockwise direction beyond the vertical position illustrated in FIG. 8. Hinge 420 is similar.

When a separator sheet 11 is dropped on the carriage 300 and the carriage 300 moves to the right to the position shown in phantom in FIG. 1, the leading edge of the separator sheet hits the leaf 428 and causes the leaf to rotate counterclockwise so that it extends in a nearly horizontal position and the separator sheet may then pass under the hinges 420 and 422 (FIG. 9). When the carriage 300 is in its fully extended position, the rear edge of the separator sheet has moved to the right of the leaf 428, and consequently the leaf 428 is free to fall down behind the separator sheet and to assume the vertical position as illustrated in FIGS. 1 and 8. When the carriage 300 then retracts moving to the left, the leaf 428 prevents the separator sheet on the carriage from returning with the carriage. As the carriage 300 is retracted, the separator sheet falls into place on top of a layer of newspaper bundles.

Thus it is clear that the present invention provides a separator sheet feeder 10 (FIG. 1) which can lift a separator sheet 11 from a nested stack 12 of such sheets and place the sheet on a layer 16 of newspaper bundles 13 on a pallet 14. The separator sheet feeder 10 includes an elevator 22 which supports a nested stack 12 of separator sheets 11. A suction device 152, 154 lifts the top sheet 11a off the stack 12 and holds it up while a reciprocating carriage 300 moves laterally into a position between the stack 12 and the lifted sheet. Thereafter, the lifted sheet 11 is dropped onto the carriage 300, and the carriage moves laterally carrying the separator sheet to a position over the layer 16 of newspaper bundles 13 on a pallet 14. A stripper 422, 424 engages the rear edge of the separator sheet 11 as the carriage 300 withdraws to hold the separator sheet in position, and the separator sheet then drops onto the layer of newspaper bundles 13. The separator sheet feeder 10 not only lifts a separator sheet 11 vertically upward from a stack 12 of nested separator sheets 11 but also has a very short cycle time enabling rapid operation because one sheet is lifted off the stack while the preceeding sheet is being delivered to the top of a layer of bundles.

What is claimed is:

1. An apparatus for feeding a separator sheet onto a layer of articles on a pallet, said apparatus comprising a frame, elevator means for supporting a stack of separator sheets in said frame, reciprocatable carriage means for receiving one of said separator sheets, guide means for guiding said carriage means in reciprocating motion from a first location above said stack of separator sheets to a second location above the layer of articles, suction means for lifting one separator sheet from said stack of separator sheets to a position above said stack of separator sheets and above said first location of said carriage means when said carriage means is in said second location and for releasing said one separator sheet onto said carriage means when said carriage means is in said first location, and stripper means for holding a separator sheet moved on said carriage means from said first location to said second location against movement as said carriage means moves from said second location to said first location to thereby deposit said separator sheet on said layer of articles, said suction means including a vacuum source, at least one suction cup, and valve means for selectively communicating said suction cup with said vacuum source, said apparatus further including linkage means for moving said suction cup to a lower position in which said vacuum source is effective to draw a separator sheet from said stack of separator sheets into tight engagement with said suction cup and an upper position spaced above said lower position to lift said separator sheet from said stack of separator sheets on said elevator means, said linkage means including a four-bar linkage, said drive means including a rotatable cam, a cam follower and a lost motion connection between said cam follower and said four-bar linkage.

2. An apparatus as set forth in claim 1 further including drive means for moving said carriage means between said first and second locations and for actuating said linkage means to move said suction cup between said lower and upper positions after said carriage means has moved from said first location toward said second location and before said carriage means has returned to said first location from said second location.

3. An apparatus for feeding a separator sheet onto a layer of newspaper bundles on a pallet, said apparatus comprising a frame, elevator means for supporting a stack of nested separator sheets in said frame, suction means for lifting the top separator sheet from said stack of nested separator sheets, carriage means laterally reciprocatable from a first position for receiving said one lifted separator sheet from said suction means to a second position above said layer of newspaper bundles on said pallet, and means for holding a separator sheet moved by said carriage means to said second position against lateral movement when said carriage means returns from said second position to said first position, said suction means including at least one suction cup, linkage means connected with said frame and said suction cup for moving said suction cup in a generally vertical path between a lower position in which said suction cup engages said top separator sheet of said stack of nested separator sheets and an upper position above said stack of nested separator sheets, said linkage means including a four-bar linkage, and said apparatus further including a cam, a cam follower disposed in engagement with said cam and connected with said linkage means, drive means for effecting relative movement between said cam and said cam follower to effect movement of said linkage, and a lost motion connection between said cam follower and said four-bar linkage.

4. An apparatus as set forth in claim 3 further including rails for guiding said carriage means between said first and second positions, said carriage means including a plurality of wheels in rolling engagement with said guide rails.

5. An apparatus as set forth in claim 3 wherein said drive means is effective to drive said carriage means along said guide rails between said first and second positions, and said movement of said carriage means is synchronized with the movement of said suction cup so that said top separator sheet is lifted from said nested stack of separator sheets between the time when said carriage means moves from said first position toward said second position and the time said carriage returns to said first position from said second position.

6. An apparatus as set forth in claim 3 wherein said carriage means includes platform means for supporting a separator sheet, said platform means including surface means defining a generally flat plane for engaging the bottom surface of a separator sheet.

* * * * *